May 26, 1925.

C. A. NICKLE 1,539,690

STROBOSCOPIC DEVICE

Filed Aug. 7, 1924

Inventor:
Clifford A. Nickle,
by *Alexander S. Lintz*
His Attorney.

Patented May 26, 1925.

1,539,690

UNITED STATES PATENT OFFICE.

CLIFFORD A. NICKLE, OF SCHENECTADY, NEW YORK, ASSIGNOR TO GENERAL ELECTRIC COMPANY, A CORPORATION OF NEW YORK.

STROBOSCOPIC DEVICE.

Application filed August 7, 1924. Serial No. 730,718.

*To all whom it may concern:*

Be it known that I, CLIFFORD A. NICKLE, a citizen of the United States, residing at Schenectady, in the county of Schenectady, State of New York, have invented certain new and useful Improvements in Stroboscopic Devices, of which the following is a specification.

My invention relates to a stroboscopic device and has for its object to provide a simple device of this character suitable for the measurement and observation of angular variations and displacements of rotating apparatus.

Previous methods of making these measurements involved the use of a rotating disc and the measurement of small mechanical angles.

In carrying my invention into effect, instead of employing a rotating disc, I provide a simple vibrating reed having a slit in its free end which is arranged to vibrate across a corresponding slit in a stationary supporting structure. The reed is vibrated in synchronism with the synchronous speed of the rotating element under observation by means of an electromagnetic vibrator made responsive to an alternating current having a frequency corresponding to the synchronous speed of the rotating element. Means are provided for varying the phase angle of the current supplied to the magnetic vibrator so as to correspondingly vary the phase angle displacement of the vibrating reed with respect to the supply voltage. The measurement of the angular displacement of a rotating element such as the rotating element of a synchronous motor is made by observing the element through the stationary and vibrating slits. The phase angular adjustment of the alternating current supplied to the vibrator with respect to that of the supply voltage necessary to keep the reference point or points of the rotating element under observation for a given angular displacement thereof is a direct measure of the displacement in electrical degrees and which in most cases is of much greater magnitude than the corresponding mechanical degrees.

Figure 1:
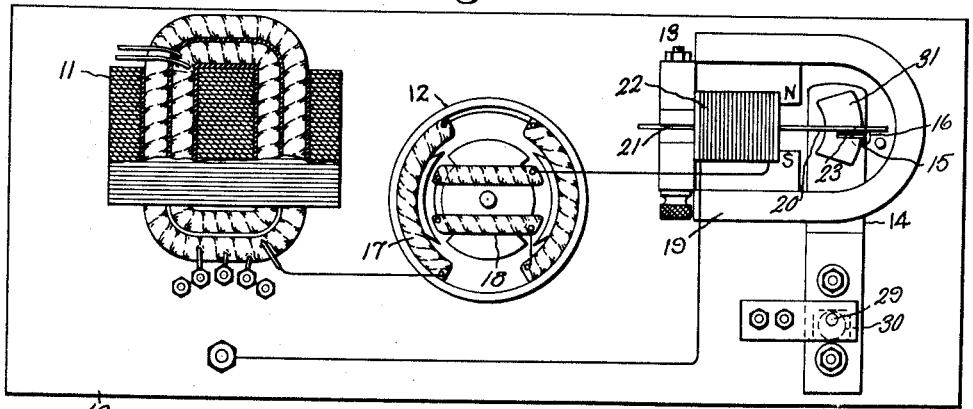
Figure 2:
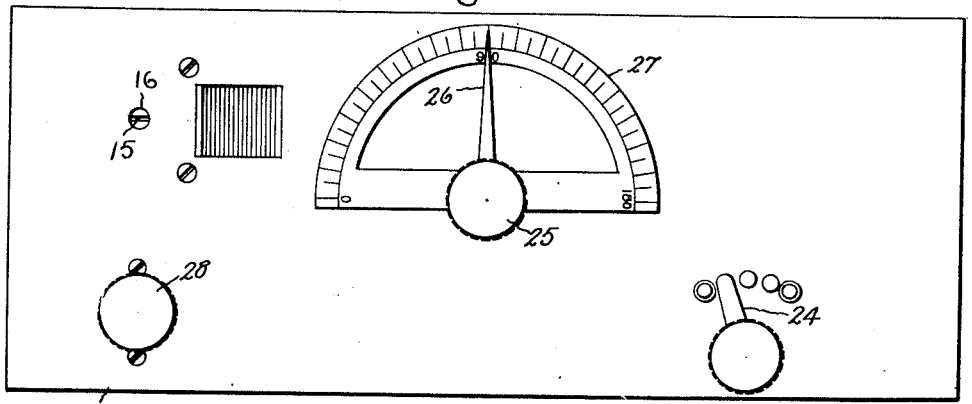
Figure 3:
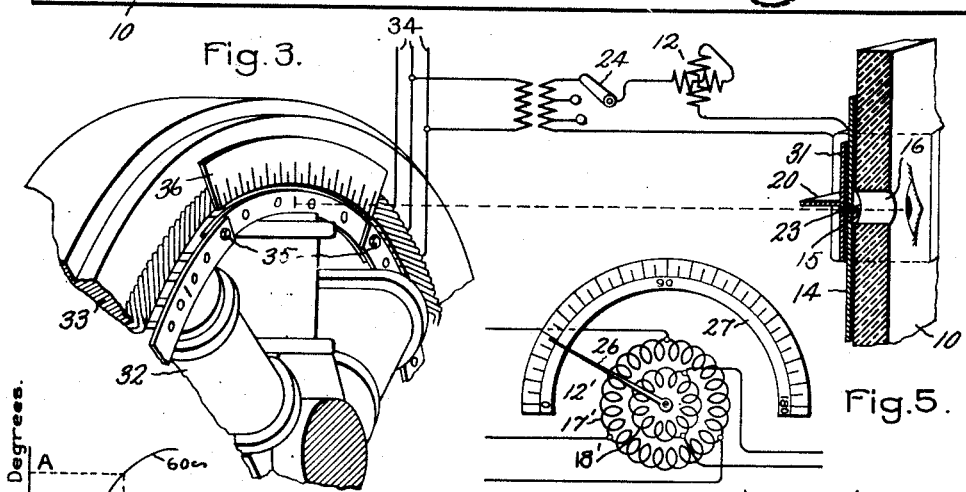
Figure 4:
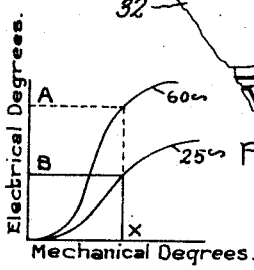
Figure 5:
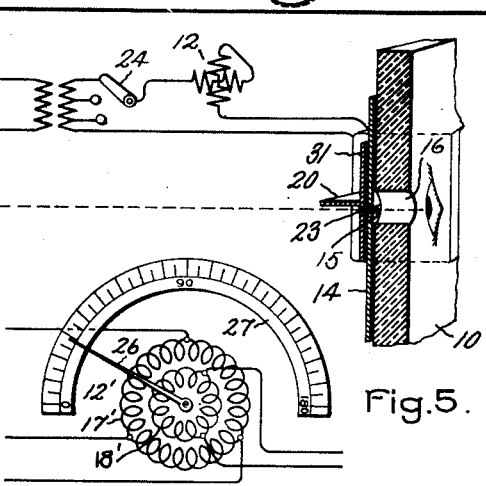

The features of my invention which are believed to be novel and patentable will be pointed out in the claims appended hereto. For a better understanding of my invention, reference is made in the following description to the accompanying drawing in which Figs. 1 and 2 show rear and front views respectively of the apparatus arranged in portable form; Fig. 3 is a schematic diagram partially in section showing the arrangement of the movable and stationary slits, the use of the apparatus for measuring the phase angular displacement of the rotating element of a synchronous machine with respect to the stationary element and the circuit connections for such use; Fig. 4 shows calibration curves for different frequencies; and Fig. 5 represents another form of phase shifter which may be used to advantage where a polyphase source of supply is available.

Referring now to the drawings and more in particular to Figs. 1, 2 and 3, I have represented a base plate 10 made of hard rubber or other suitable material. This plate supports on its rear side an adjustable step-down transformer 11, a phase angle adjuster 12, a vibrator 13 and a relatively stationary but adjustable member 14 having a horizontal slit 15 adjacent an observation opening 16 in the base plate 10. The step-down transformer 11 is not essential but is convenient in order to obtain a low voltage suitable for the apparatus from various higher voltage sources. The phase angle adjuster shown in Fig. 1 is simply a pair of relatively rotatable coils 17 and 18 wound on suitable magnetic members. By rotating one coil with respect to the other, the phase angle of the current flowing from the transformer 11 to the vibrator 13 is changed thereby. The vibrator consists in this instance of a stationary permanent magnet 19 between the poles of which is placed a magnetic reed 20 having one end secured at 21 and the other end free to vibrate. Around this reed is wound a coil 22 which is supplied from the transformer 11 through the phase angle adjuster 12. As the current in this coil alternates, the flux in the magnetic reed will alternate and the reed will be attracted first in one direction and then in another by the N and S poles of the permanent magnet between which it is thus caused to vibrate. The natural period of vibration of the reed should be somewhere near the periodicity of the alternating current. For instance, when changing from 60 to 25 cycles, the reed should be changed or its natural period of vibration changed by suitable adjustments such as the addition of a weight on its free end. The free end of the reed carries a light plate 31 secured thereto by solder or otherwise and in this plate is a horizontal slit 23 arranged to momentarily uncover the slit in the relatively stationary member 14 as the reed vibrates past its central position.

It will now appear that the instants of coincidence of the two slits 15 and 23 may be made to vary with respect to a given point on the alternating current voltage wave of the supply circuit by varying the phase angle of the current supplied to the vibrator by the adjusting device 12.

The front side of the base plate 10 carries a suitable switch 24 in the secondary circuit of the transformer 11, a handle 25 connected to the shaft of the rotating element of the phase angle adjuster 12, a pointer 26 secured to the same shaft, a graduated scale 27 with which pointer 26 cooperates, and a handle 28 for adjusting the vertical position of slit 15 carried by the member 14. In the present case the handle 28 is secured to a short shaft 29 which passes through the base plate 10. The member 14 is provided with an opening in which a cam 30, secured to the rear end of shaft 29, is positioned. This provides a convenient means of vertically adjusting the slit 15 with respect to the observation opening 16.

In Fig. 3 I have illustrated the use of the apparatus for measuring the angular displacement of the rotor field member 32 of a synchronous motor with respect to its stator member 33. For this purpose the motor and the stroboscopic device are excited from a common source of alternating current designated at 34. The switch 24 is closed and the reed 20 vibrates in synchronism with the alternating current supply. Let us assume it is desired to measure the angle of lag of the rotor 32 with respect to the stator 33 which is due to a change from no load to full load. With no load on the synchronous motor, the device 12 is preferably adjusted to a position which produces no change in the phase angle of the current supplied to the vibrator. This position should preferably correspond to a zero reading of the pointer 26 with respect to scale 27. Then the member 14 is adjusted until the slit 15 therein is at the center of the swing of the slit 23 in the plate 31 carried by the reed. This is done by observing a portion of the rotor through the two slits in the manner indicated in Fig. 3 and adjusting the vertical position of slit 15 until reference points on the rotor spaced one pole apart appear in exactly the same place. The reference point may be one edge of the rotor poles or the nuts 35 which secure the poles in place or it may be corresponding markings on the end of the rotor. During one complete cycle, two rotor poles pass the line of observation. The rotor is observed twice per cycle corresponding to coincidence of the two slits as the reed vibrates up and down.

Now, load is applied to the motor, and as is well known, this causes the rotor to lag behind the synchronously rotating field in an amount which is proportional to the load. When the load becomes steady, the rotor rotates at synchronous speed as before, but the observer will no longer see the reference point in the same position as for no load. In other words, the observer will see the rotor shift through the angle of lag and he can roughly estimate the mechanical angle by referring to a scale such as shown at 36 by direct observation. A higher degree of accuracy is generally required than can be obtained by direct observation because in machines having large number of poles, the mechanical angle of lag is very small. The electrical angle is measured by now adjusting the phase angle adjuster 12 until the reference point comes back to its original position, or the observer may keep the reference point in the same position by making the adjustment while the change in load is being made. The scale 27 may be calibrated in electrical degrees and the extent of movement of pointer 26 necessary to make the reference points appear in the same position before and after the change in load is an accurate measure of the electrical angle through which the rotor shifted due to the change in load. The result is that the vibrating reed is caused to lag behind the primary voltage wave to the same extent that the rotor shifted with respect to the synchronously rotating field of the stator during the change in load. To measure the angle of advance of the rotor of a synchronous generator due to an increase in load, the zero setting of the pointer 26 may be made while the generator is loaded and the measuring adjustment made in the same way as before as the load is decreased. Obviously, the phase shifting device could be arranged to advance the phase of the vibrating reed instead of lagging it.

Where the device is to be used on widely different frequencies, such as 25 and 60 cycles, the phase angle adjuster may not produce the same electrical angle of shift for a given mechanical adjustment for both frequencies so that it is then preferable to provide the scale with an arbitrary graduation such for example as 180° to the half circle and refer to a chart for the corresponding electrical degrees for the different frequencies. Such a chart is represented in Fig. 4. Thus, if the pointer 26 indicates X mechanical degrees, this will correspond to A electrical degrees when 60 cycles is used and B electrical degrees when 25 cycles is used.

When a polyphase source of alternating current is available, it will generally be preferable to use a slightly different type of phase adjuster from that previously described, namely, a phase angle adjuster which needs no calibration for changes in frequency and one in which the mechanical degrees and always equal to the electrical degrees. Such a phase angle adjuster consists of a two-pole, polyphase induction motor of the wound rotor type as represented at 12' in Fig. 5. The primary winding 17' is connected to a polyphase source of supply and one phase of the secondary 18' will be connected to the vibrator coil of the stroboscopic device. With such an arrangement, it will be apparent that the phase angle of the current supplied to the vibrator may be varied by rotating the secondary winding with respect to the primary winding and that the electrical angle of shift will always correspond to the mechanical angle of rotation. This will be true irrespective of the frequency of the source of supply and the angle may be varied any desired amount, whereas, with the device previously described, it is rather difficult to obtain a phase displacement of much over 60 degrees.

When the device is to be used for measuring the slip of an induction motor, it is used in the same way except that no adjustment of phase angle adjusting device is necessary and the slip is obtained by direct observation and count over a given time interval.

In accordance with provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. A stroboscopic device, comprising a vibratory member therefor having an observation opening therein, an electric vibrator for vibrating said member, a source of alternating current for supplying said vibrator, means for adjusting the phase of the current supplied to the vibrator with respect to the phase of the source of supply, and means for measuring the extent of such adjustment.

2. In combination, an alternating current dynamo electric machine, a stroboscopic device responsive to an alternating current for studying the rotative behavior of said machine, a common source of alternating current for supplying said machine and device, means for varying the phase angle between the current supplied to said machine and device, and means for determining the magnitude of such angle.

3. A stroboscopic device comprising a vibratory member provided with an observation opening, an electromagnetic vibrator responsive to an alternating current for vibrating said member, a source of alternating current for supplying said vibrator, a phase angle adjuster having relatively movable parts connected between said source of supply and vibrator for changing the phase angle of the current supplied to said vibrator with respect to the phase of the source of supply, a scale secured in fixed relation with one of the parts of said phase angle adjuster and a pointer cooperating with said scale secured to the other part of said phase angle adjuster whereby the phase angle adjustment may be determined.

4. A stroboscopic device comprising a support, an observation opening in said support, a member adjustable with respect to said support and provided with a slit adjacent said opening, a second member provided with a slit and positioned with respect to the first mentioned member so that their respective slits may be made to coincide in alinement with the observation opening, and means for vibrating the last mentioned member in synchronism with an alternating current.

5. A portable stroboscopic device comprising a supporting plate having a relatively large observation opening therein, a pair of members provided with restricted observation openings in alinement with the openings in said plate, an alternating current electromagnetic vibrator for vibrating one of said members with respect to said plate, means for adjusting the other member so that the openings in both members coincide when the vibrating member is at the center of its amplitude, a phase angle adjuster for said vibrator, an adjustable transformer for supplying said vibrator through said phase angle adjuster, all of said parts being mounted on one side of said plate, shafts passing through said plate and terminating in handles on the other side thereof for adjusting the various devices, a scale on the last mentioned side of said plate and a pointer on the shaft of the phase angle adjuster cooperating with said scale whereby the electrical angle of adjustment of said phase angle adjuster may be determined.

6. The method of measuring changes in the angle of lead or lag of a synchronous dynamo electric machine under different operating conditions which consists in observing the rotating element of said machine with a stroboscopic device which is energized from the alternating current terminals of said machine, changing the phase angle relation of the current supplied to said stroboscopic device so as to obtain the same stroboscopic appearance of the rotating element before and after the change in operating condition and then measuring the phase angle through which the current is adjusted.

In witness whereof, I have hereunto set my hand this 6th day of August, 1924.

CLIFFORD A. NICKLE.